(12) United States Patent
Ling, III et al.

(10) Patent No.: US 11,410,201 B2
(45) Date of Patent: *Aug. 9, 2022

(54) MARKETING TO CONSUMERS USING DATA OBTAINED FROM ABANDONED GPS SEARCHES

(71) Applicant: MOV-OLOGY, LLC, Anaheim, CA (US)

(72) Inventors: Thomas Chow Ling, III, Yorba Linda, CA (US); Peter Iveson Norton, Yorba Linda, CA (US)

(73) Assignee: MOV-ology, LLC, Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/162,262

(22) Filed: Jan. 29, 2021

(65) Prior Publication Data

US 2021/0209654 A1    Jul. 8, 2021

Related U.S. Application Data

(63) Continuation of application No. 16/150,539, filed on Oct. 3, 2018, now Pat. No. 10,929,892.

(60) Provisional application No. 62/568,422, filed on Oct. 5, 2017.

(51) Int. Cl.
| | | |
|---|---|---|
| *G06Q 30/00* | (2012.01) | |
| *G06Q 30/02* | (2012.01) | |
| *H04L 67/306* | (2022.01) | |
| *G01S 19/24* | (2010.01) | |
| *G06F 16/29* | (2019.01) | |
| *H04L 67/52* | (2022.01) | |

(52) U.S. Cl.
CPC ........ *G06Q 30/0271* (2013.01); *G01S 19/243* (2013.01); *G06F 16/29* (2019.01); *H04L 67/18* (2013.01); *H04L 67/306* (2013.01)

(58) Field of Classification Search
None
See application file for complete search history.

(56) References Cited

U.S. PATENT DOCUMENTS

| | | |
|---|---|---|
| 6,112,212 A | 8/2000 | Heitler |
| 9,280,531 B2 | 3/2016 | Ling et al. |
| 9,286,282 B2 | 3/2016 | Ling et al. |
| 9,589,281 B2 | 3/2017 | Ling et al. |

(Continued)

OTHER PUBLICATIONS

Brinkman, John; "Track PDF Forms with Omniture", Mar. 15, 2010; Adobe FormFeed Blog; blogs.adobe.com/formfeed/2010/03/track_pdf_forms_with_omniture.html.

(Continued)

*Primary Examiner* — Matthew T Sittner
(74) *Attorney, Agent, or Firm* — Knobbe, Martens, Olson & Bear, LLP

(57) ABSTRACT

Users that abandon GPS searches on GPS enabled devices before arriving at the search location are lost to business entities. The system uses the data obtained from abandoned GPS searches to identify these lost users. Sometimes a unique script embedded in the GPS application loaded onto the user's GPS enabled device scrapes the data from the GPS search and from user entries on the GPS enabled device. The system uses the obtained data to market or remarket to the lost consumers by sending personalized messages via a preferred communication medium.

18 Claims, 11 Drawing Sheets

(56) References Cited

U.S. PATENT DOCUMENTS

| | | |
|---|---|---|
| 10,042,838 B2 | 8/2018 | Ling et al. |
| 10,769,358 B2 | 9/2020 | Ling et al. |
| 2001/0043234 A1 | 11/2001 | Kotamarti |
| 2003/0065620 A1 | 4/2003 | Gailey et al. |
| 2003/0144925 A1 | 7/2003 | Greenberg |
| 2004/0073482 A1 | 4/2004 | Wiggins et al. |
| 2004/0078447 A1 | 4/2004 | Malik et al. |
| 2005/0278231 A1 | 12/2005 | Teeter |
| 2009/0037279 A1 | 2/2009 | Chockalingam et al. |
| 2009/0138439 A1 | 5/2009 | Yeung et al. |
| 2009/0193116 A1 | 7/2009 | Clucas |
| 2009/0204624 A1 | 8/2009 | Basson et al. |
| 2009/0234717 A1 | 9/2009 | Wiggins et al. |
| 2010/0023401 A1 | 1/2010 | Ariyibi |
| 2013/0006816 A1* | 1/2013 | Nuzzi ................ G06Q 10/0836 705/27.1 |
| 2013/0073405 A1 | 3/2013 | Ariyibi |
| 2013/0311621 A1 | 11/2013 | Tyson et al. |
| 2014/0068409 A1 | 3/2014 | Hicks et al. |
| 2014/0106782 A1 | 4/2014 | Chitre et al. |
| 2015/0149877 A1* | 5/2015 | Ling, III ............... G06F 40/205 715/221 |
| 2015/0149878 A1 | 5/2015 | Ling et al. |
| 2016/0117726 A1* | 4/2016 | Lee .................... G06Q 30/0633 705/14.53 |
| 2016/0148273 A1 | 5/2016 | Ling et al. |
| 2017/0228355 A1 | 8/2017 | Ling et al. |
| 2019/0095411 A1 | 3/2019 | Ling et al. |
| 2019/0108555 A1 | 4/2019 | Ling et al. |

OTHER PUBLICATIONS

Shumpert, Rudi; "Form Abandonment"; Nov. 11, 2009; www.rudishumpert.com/2009/11/11/form-abandonment/.

STIC EIC 3600 Search Report for U.S. Appl. No. 16/150,539, dated Apr. 13, 2020 (Year: 2020).

httpWatch Blog, "Using Protocol Relative URLs to Switch between HTTP and HTTPS"; Feb. 10, 2010; https://blog.httpwatch.com/2010/02/10/usingprotocolrelativeurlstoswitchbetweenhttpandhttps/.

* cited by examiner

MARKETING TO CONSUMERS USING DATA OBTAINED FROM ABANDONED GPS SEARCHES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Business entities lose thousands of prospective consumers each day. Typically, a consumer performs a global positioning system (GPS) search on a GPS enabled device and fails to travel to at least one location specified in the search results. These consumers may not complete the GPS search for a variety of reasons that are often unknown to the business entity. Consequently, these lost consumers typically result in lost revenues for the business entity.

SUMMARY

System and methods disclosed obtain data from abandoned GPS searches and to market materials related to the abandoned GPS searches to the consumers. Users that abandon GPS searches on GPS enabled devices before arriving at the search location are lost to business entities. The system uses the data obtained from abandoned GPS searches to identify these lost users. Sometimes a unique script embedded in the GPS application loaded onto the user's GPS enabled device scrapes the data from the GPS search and from user entries on the GPS enabled device. The system uses the obtained data to market or remarket to the lost consumers by sending personalized messages via a preferred communication medium.

Further, systems and methods disclosed provide intelligent marketing to the consumers based on the scraped data and the additional identifying information. In one embodiment, the system further comprises an intelligent marketing matrix module that is configured to determine a preferred method of communication. For example, the intelligent marketing matrix module will determine whether to send an email, a text message, or printed material through direct mail to the lost consumer. In another embodiment, the intelligent marketing matrix takes into account the consumer's preferences or the preferences of the business entity associated with the electronic form. For example, if the business entity only wants to contact lost consumers through email, then that will override the determination of whether to send an email, a text message, or printed material through direct mail.

The system then sends to the consumer, using one or more of the preferred methods of communication, a reminder, an incentive such as electronic coupon, information about the desired products and services, discount notifications, or an offering for a similar product or service, etc. In one or more embodiments, the system also generates reports including by way of example, the identities of the abandoning consumers, consumer's names, email addresses and account status. Other reports may include the number of completed forms, number of abandoned forms, and the number of abandoning consumers that have been subsequently contacted.

Certain embodiments relate to a method to market to consumers with data obtained from abandoned GPS searches. The method comprises determining that a GPS search on a GPS enabled device accessed by a user has been abandoned by the user; obtaining data from the abandoned GPS search; and sending a personalized message to the user based at least in part on the obtained data. In an embodiment, the method further comprises determining when the GPS search has been abandoned by the user. In an embodiment, determining that the GPS search has been abandoned by the user comprises determining at least one of (i) the user has traveled to a location associated with a search result, (ii) the user has called a phone number associated with the search result, and (iii) the user has checked a review associated with the search result. In an embodiment, the method further comprises embedding script in a GPS application loaded onto the GPS enabled device. In an embodiment, obtaining data from the abandoned GPS search comprises scraping the data from the abandoned GPS search using the script. In an embodiment, the obtained data provides an indication of a preferred communication medium of the user and the personalized message is sent to the user via the preferred communication medium.

According to a number of embodiments, the disclosure relates to a method market to consumers with data obtained from abandoned GPS searches. The method comprises determining that a GPS search accessed by a user on a GPS enabled device running a GPS application that is loaded onto the GPS enabled device has been abandoned by the user. The GPS application has embedded computer-executable instructions and one or more fields configured to accept user-entered text and user touch indications. The GPS search comprises at least one hypertext markup language (HTML) element associated with the one or more fields, and the at least one HTML element has at least one attribute. The method further comprises obtaining data from the abandoned GPS search with the embedded computer-executable instructions by building a data structure based on the abandoned GPS search; parsing the data structure to obtain the at least one HTML element; storing one or more of the at least one HTML element, the at least one attribute, and the user-entered text; determining identifying information of the user based at least in part on the user-entered text and user touch indications; identifying a preferred communication medium of the user; and sending a personalized message to the user based at least in part on the identifying information via the preferred communication medium.

In an embodiment, the method further comprises sending a message to the Internet protocol (IP) address associated with the GPS enabled device used to perform the GPS search when the identifying information of the user cannot be determined. In an embodiment, the preferred communication medium comprises one or more of an email, a text message, printed material sent through direct mail, and a message on a social media site. In an embodiment, the personalized message comprises one or more of a coupon, a reminder, information related to the electronic form, discount notifications, an offering related to the GPS search, a link to return to a webpage associated with the GPS search, a lightbox image, and an advertisement. In an embodiment, the personalized message is sent to the user within approximately one minute after determining that the user abandoned the GPS search.

In an embodiment, the method further comprises tracking GPS search events with one or more of an IP address, a user agent, and a timestamp to create event tracking information, the GPS search events associated with the user performing the GPS search. In an embodiment, the method further comprises compiling the identifying information and the event tracking information into reports. In an embodiment, the method further comprises evaluating patterns in the stored one or more of the at least one HTML element, the at least one attribute, and the user-entered text. In an embodiment, the method further comprises determining a location of the user, wherein determining that the GPS search has been abandoned by the user is based at least in part on the location of the user.

According to a number of embodiments, an apparatus to market to consumers with data obtained from abandoned GPS searches is disclosed. The apparatus comprises computer hardware configured to determine that a GPS search accessed by a user on a GPS enabled device running a GPS application that is loaded onto the GPS enabled device has been abandoned by the user, where the GPS application has embedded computer-executable instructions and one or more fields configured to accept user-entered text. The GPS search comprises at least one hypertext markup language (HTML) element associated with the one or more fields, and the at least one HTML element has at least one attribute. The apparatus further comprises computer hardware configured to obtain data from the abandoned GPS search with the embedded computer-executable instructions by building a data structure based on the abandoned GPS search; computer hardware configured to parse the data structure to obtain the at least one HTML element; computer hardware configured to store one or more of the at least one HTML element, the at least one attribute, and the user-entered text; computer hardware configured to determine identifying information of the user based at least in part on the user-entered text; computer hardware configured to identify a preferred communication medium of the user; and computer hardware configured to send a personalized message to the user based at least in part on the identifying information via the preferred communication medium.

In an embodiment, the apparatus further comprises computer hardware configured to send a message to the Internet protocol (IP) address associated with the GPS enabled device used to perform the GPS search when the identifying information of the user cannot be determined. In an embodiment, the preferred communication medium comprises one or more of an email, a text message, printed material sent through direct mail, and a message on a social media site. In an embodiment, the personalized message comprises one or more of a coupon, a reminder, information related to the electronic form, discount notifications, an offering related to the GPS search, a link to return to a webpage associated with the GPS search, a lightbox image, and an advertisement. In an embodiment, the personalized message is sent to the user within approximately one minute after determining that the user abandoned the GPS search.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SPECIFIC EMBODIMENTS

The present invention comprises a computer-implemented identification and marketing service that identifies users of GPS enabled devices that abandon a GPS search and permits marketing, such as targeted or personalized marketing, to these users. The identification and marketing service markets or remarkets in real time or approximately real time to the users and tracks the users as they access the GPS application on the GPS enabled device. The identification and marketing service advantageously enables business entities to reach lost consumers with marketing and enticements to induce the consumer to not to abandon the GPS search, but to become a repeat customer. Further, the identification and marketing service provides the business entities with reports in real time or near real time showing what the users are choosing and abandoning.

Figure 1:
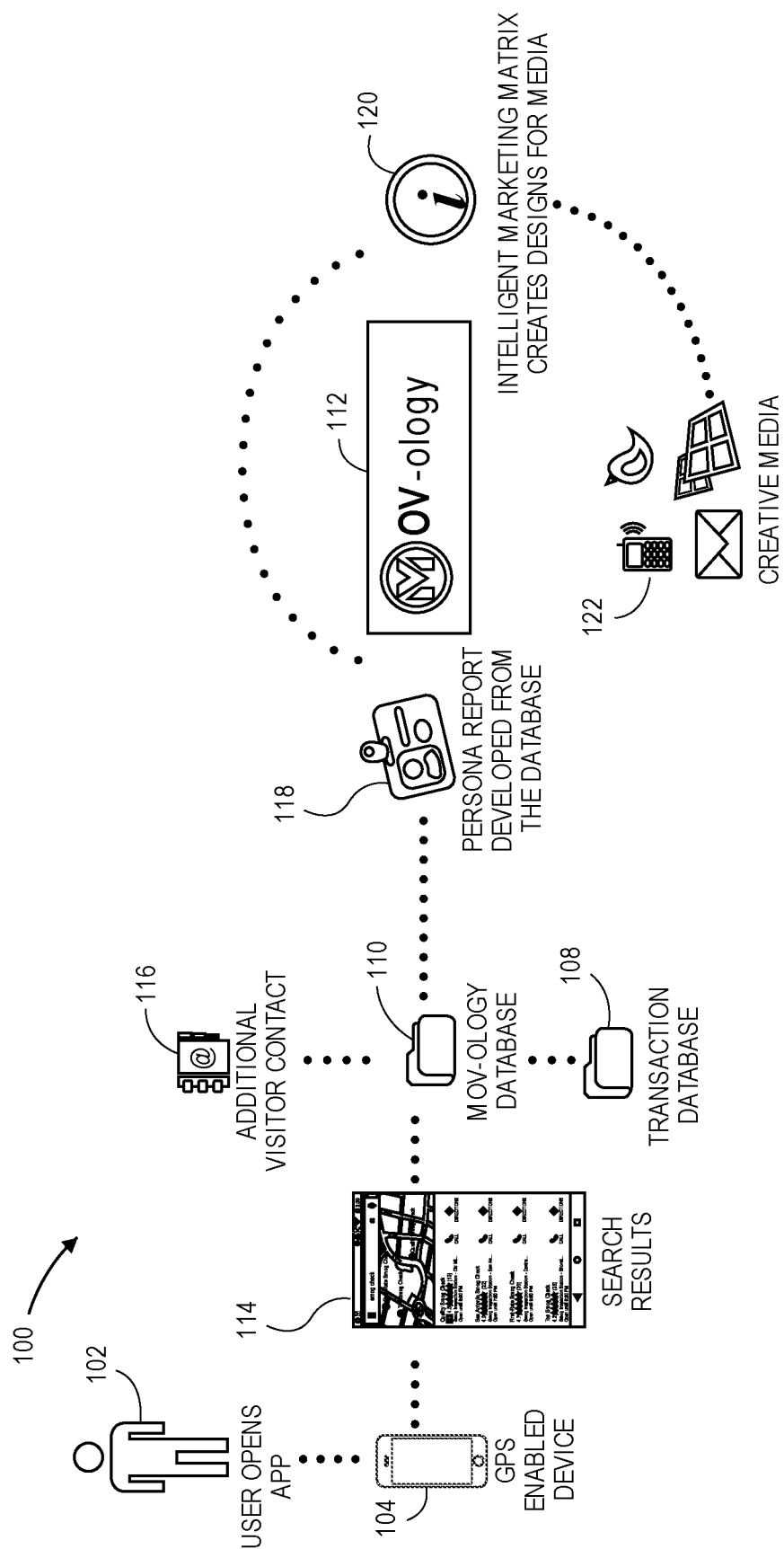
FIG. 1 illustrates one embodiment of a user marketing system, according to certain embodiments.

For a more detailed understanding of the invention, reference is first made to FIG. 1. FIG. 1 illustrates one embodiment of a user identification and marketing system 100. In an embodiment, a user 102 accesses a GPS application 104 on a GPS enable device and performs a GPS search. The GPS application 104 may be provided by the business entity or a third party associated with the business entity. The user 102 may enter a location or other personal information into the GPS application.

At some point in the process, the user 102 may abandon the GPS search, as indicated by item 114 in FIG. 1. The determination that the user 102 abandoned the GPS search can be based on a variety of factors including length of time, leaving the search results, failure to arrive at at least one location provided in the search results, failure to access a review of at least one business provided in the search results, failure to call at least one business provided in the search results, etc.

The identification and marketing service 112 scrapes the user data from the abandoned GPS search and saves the scraped data in the identification and marketing database 110. In an embodiment, the identification and marketing service 112 uses novel data scraping snippets embedded in the GPS application to scrape the data. In a further embodiment, the identification and marketing system 112 accesses the transaction database 108 to obtain past transactional information. This data can include, by way of example, a user's email address, a user's name, ZIP Code, or other personal information, the user's IP address, and the like.

The identification and marketing system 112 may use one or more of data associated with the abandoned GPS search in the identification and marketing database 110, data associated with past complete GPS search results in the transactional database 108, and data from third party databases to determine the identity of the user 102. The system 100 may provide the identity of the user 102 to the application provider, clients of the identification and marketing system, and/or business entities found in the abandoned search results. In other embodiments, the user's identity can be used by the identification and marketing service 112, the business entity, or a third party to better market goods and services to the user. In one embodiment, the identification and marketing service 112 provides additional user contact 116 to the user 102. In some embodiments, the additional user contact 116 is provided when the determination is made that the user 102 has abandoned the GPS search. In other embodiments, the additional user contact 116 is provided later. In further embodiments, the additional user contact 116 is provided before the determination is made that the user 102 has abandoned the GPS search.

If the user 102 accesses the GPS application, but enters no information on the GPS enabled device, the identification and marketing service 112 provides the additional marketing contact 116 using user's Internet Protocol (IP) address or using any information that is associated with the user's IP address.

In other embodiments, the identification and marketing service 112 provides a personal attribute report 118 developed from the identification and marketing database 110 and the transactional database 108. In an embodiment, the personal attribute report 118 comprises the user's public social profile, home ownership status, salary, family history, purchase patterns, and the like.

In one embodiment, the system 110 further comprises an intelligent marketing matrix module 120 that is configured to determine a preferred method of communication. In an embodiment, the personal attribute report 118, as well as data from the databases 108, 110 can be used by the identification and marketing service 112 to create the intelligent marketing matrix 120.

The intelligent marketing matrix module 120 is based on a variety of factors including, by way of example, the business entity's or GPS application providers' preferences, historical data indicating methods that have been successful with the lost user or successful with other lost consumers, the cost of different marketing methods, etc. For example, the intelligent marketing matrix module 120 will determine whether to send to the lost user 102 an email, a text message or short message service (SMS), printed material through direct mail or other marketing methods. In another embodiment, an algorithm associated with the intelligent marketing matrix module 120 will predict what marketing message to send to the user on the GPS enabled device or after the user leaves the GPS application based on the user's behavior as indicated by the scraped data. In an embodiment, the intelligent marketing matrix 120 comprises a predictive, analytic database.

The system 110 then sends to the user 102, using one or more of the preferred methods of communication, a reminder, an incentive such as electronic coupon, information about the desired products and services, discount notifications, or an offering for a similar product or service, etc.

Thus, in certain embodiments, the systems and methods determine the identity of lost consumers. In still other embodiments, the systems and methods determine preferred methods of marketing and incentivizing lost consumers to complete the GPS search. In additional embodiments, the systems and methods generate reports that assist the business entities in not only identifying lost consumers, but also how the business entities can improve the consumer process.

Figure 2:
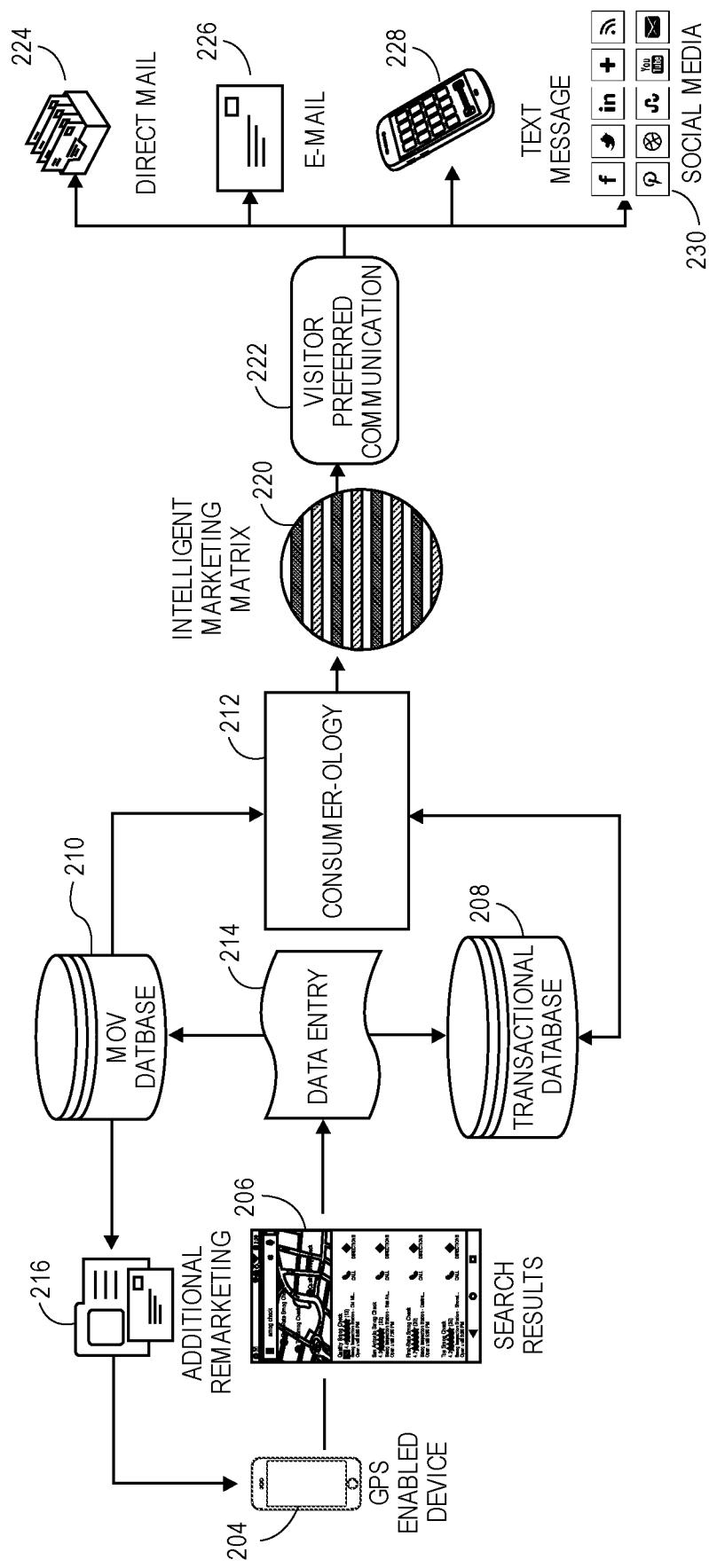
FIG. 2 illustrates another embodiment of a user marketing system, according to certain embodiments.

FIG. 2 illustrates another embodiment of a user identification and marketing system 200 comprising a GPS application 204 on a GPS enabled device, search results 206 from a GPS search, a transactional database 208, an identification database 210, an identification and marketing service 212, data 214 entered on the search request of the GPS application 204, an intelligent marketing matrix 220, and preferred user communication 222, such as direct mail 224, email 226, text message 228, social media 230, or other marketing channel.

A user or consumer accesses the GPS application 204 on the GPS enabled device, performs a GPS search, and receives GPS search results 206 associated with a business entity. The user enters data 214 after receiving the search results 206. The data 214 is saved in the transactional database 208. The data 214 from abandoned GPS search results 206 is saved in the identification database 210. In an embodiment, the identification and marketing service 212 scrapes the data 214 from the GPS application when the user has abandoned the search results 206. The identification and marketing service 212 accesses one or more of the identification database 210, the transactional database 208, and a third party database to identify the user. Using the scraped data, the identification and marketing service 212 cross-references any of the scraped data with the data records stored in the databases 208, 210, and any third-party databases to find a match. Once a match is found, the identification and marketing service 212 retrieves identifying information of the user from the data records.

Further, the identification and marketing service 212 creates the intelligent marketing matrix 220 to identify the preferred communication media 222 of the identified user. The identification and marketing service 212 sends a personalized message to the user via the user's preferred communication medium 222 to entice the user to return to a business entity on the search results 206 or a business entity related to the search results 206. In another embodiment, the identification and marketing service 212 sends a personalized message to the user via the user's preferred communication medium 222 to introduce the user to a product or service of the business entity to replace the product or service associated with the abandoned GPS search. In an embodiment, the user receives an email or social media message within one minute. In another embodiment, the user receives an email or social media message within one hour.

Figure 3:
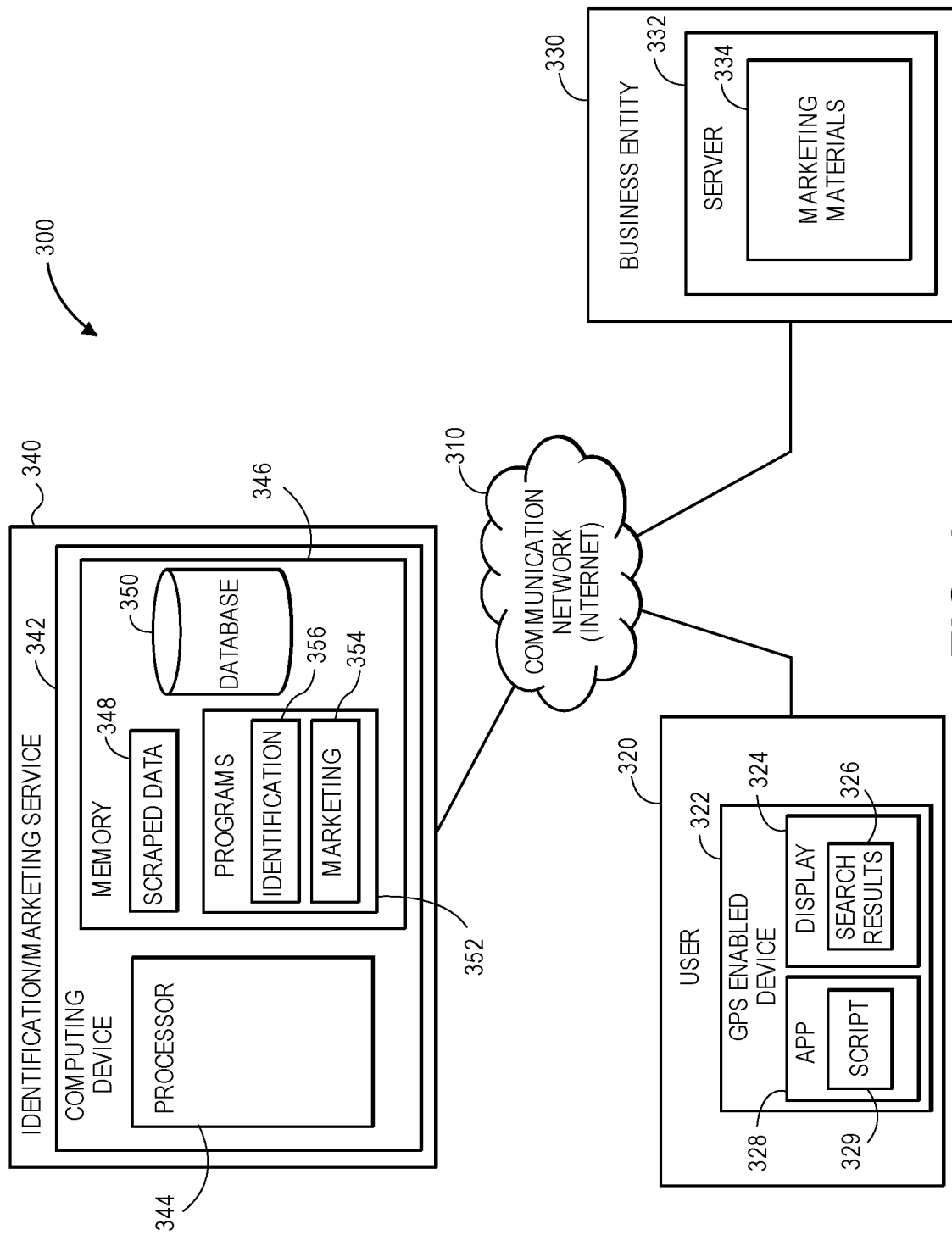
FIG. 3 illustrates the principal components of an embodiment of a system that identifies GPS application users using data scraped from GPS abandoned searches on GPS enable devices, according to certain embodiments.

FIG. 3 illustrates the principal components of an embodiment of a system 300 that identifies users that abandon a GPS search using data scraped from a user accessed GPS application.

A user 320 may be any entity that accesses a GPS application 328 on a GPS enabled device 322 and receives search results 326, typically displayed on presentation device 324. In order to access the GPS application 328, the user preferably downloads the GPS application 328 to the GPS enabled device 322. The GPS enabled device 322 can be any device that allows the user 320 to interact with the system 300, such as, for example, a conventional computer and modem, a personal computer (PC), an interactive wireless communications device, a laptop, a tablet, a netbook, an iPad, an iPhone, a smartphone, a personal digital assistant, an interactive television, a game console, or the like. The GPS enabled device 322 comprises the presentation device 324 configured to present to the user 320 the GPS search results 326. For example, the presentation device 324 can be a display configured to visually present the GPS search results 326 to the user 320, a speaker configured to audibly present the GPS search results 326 to the user 320, or the like.

The business entity 330 is any entity that provides the GPS application 328 or any entity that provides marketing materials based on the abandoned GPS search, either directly or through a third party, accessible to the user 320. In an embodiment, the business entity 330 is not limited to entities having a business license and directing their services to consumers. For example, the business entity 330 can be a school, a non-profit organization (NPO), a not-for-profit organization, or any such organization where the funds realized in the operation of the organization will not be used to benefit any owners. The business entity 330 comprises or is associated with a server 332, which can provide the marketing materials 334.

The user 320 requests the GPS application 328 from the business entity 330 or the third party provider and receives the GPS application 328, which is displayed to the user 320 on the display 324. In an embodiment, the GPS application comprises unique script or snippet 329, which is used to scrape data entered on the GPS enabled device 322.

An identification and marketing service 340 is a computer-implemented service that scrapes user-entered data from GPS enabled device 322. Further, the identification and marketing service 340 identifies the user 320 based at least in part on the scraped data. Further yet, the identification and marketing service 340 provides personalized and targeted marketing to the user 320 based at least in part on the scraped data. In a further embodiment, the identification and marketing service 340 provides one or more reports to the business entity 330 based at least in part on the scraped data.

The identification and marketing service 340 comprises a computing device 342 that comprises a processor 344 and memory 346. The processor 344 can comprise controller circuitry, processor circuitry, processors, general-purpose single-chip or multi-chip microprocessors, digital signal processors, embedded microprocessors, microcontrollers, program logic, other substrate configurations representing data and instructions, and the like.

The memory 344 comprises programs 352, such as an identification program 356, a marketing program 354, and the like. The memory 344 further comprises scraped data 348 scraped from the user accessed GPS enabled device 322, and one or more databases 350. In an embodiment, the scraped data 348 is added to the database 350. The database 350 can comprise one or more logical and/or physical data storage systems for storing data and applications used by the computing device 342.

Each of the functional components of the identification and marketing service 340 may be implemented in program code executed by one or more general or special purpose computers.

In the context of the present disclosure, actions indicated as being taken by the identification and marketing service 340 are preferably performed by or through, as applicable, the identification and marketing service computing device 342 and its associated software components. Actions indicated as being taken by the user 320 are preferably performed by or through, as applicable, the user computing device 322. Actions indicated as being taken by the business entity 330 are preferably performed by or through, as applicable, the business entity server 332 and its associated software components.

The identification and marketing service computing device 342, the user's computing device 322, and the business entity server 332 connect to a communications network 310, which preferably is or includes the Internet.

Figure 4:
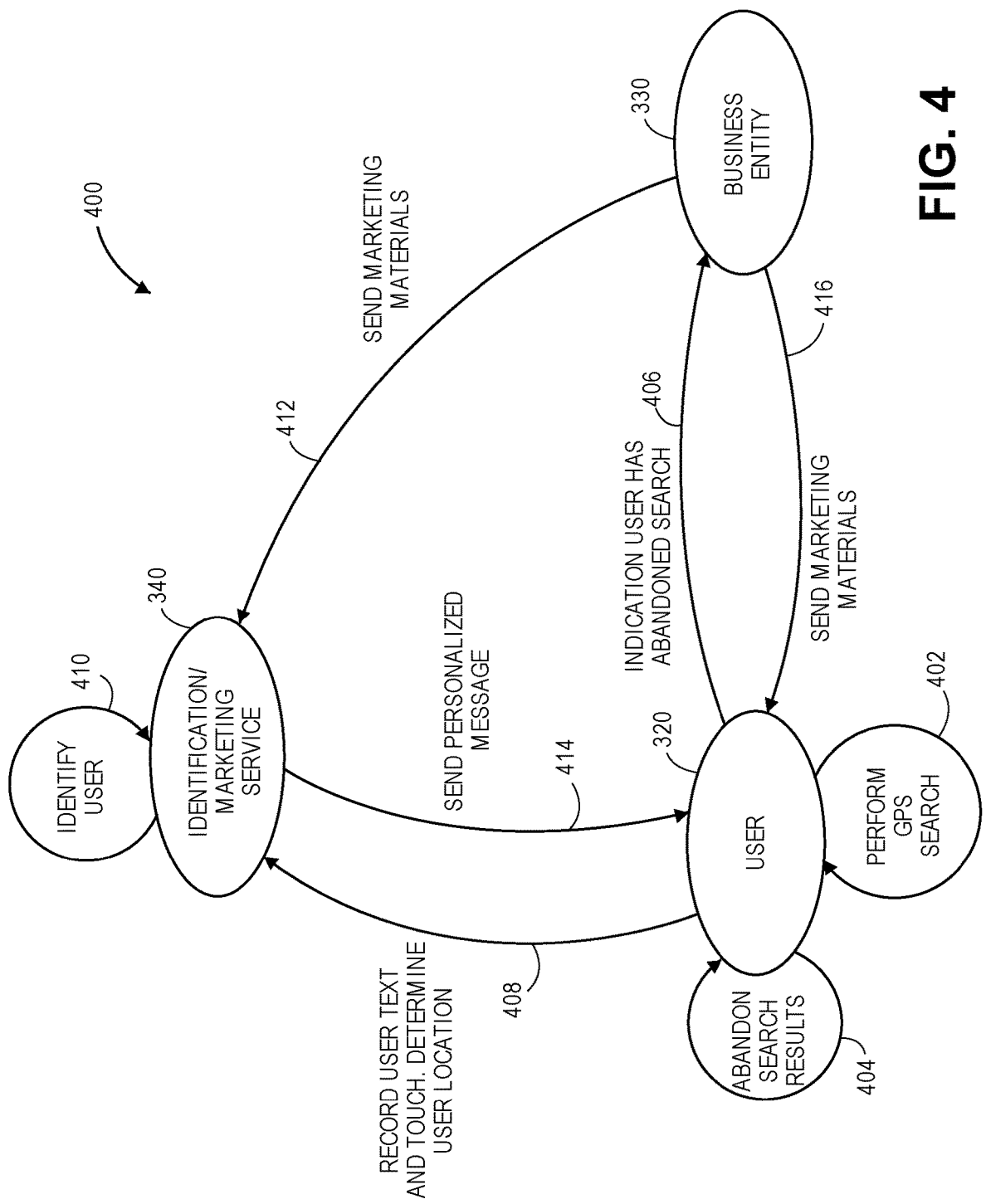
FIG. 4 illustrates a data flow diagram showing the transfer of information between the user GPS enabled device, the business entity server, and the identification/marketing service server, according to certain embodiments.

FIG. 4 illustrates an exemplary data flow diagram 400 showing the transfer of information between the user 320, the business entity 330, and the identification/marketing service 340.

At event 402, the user 320 through the user GPS enabled device 322 performs a GPS search. At event 404, the user abandons the GPS search results.

In an embodiment, the GPS application 328 includes the script 329. The script 329 comprises custom code placed in the GPS application 328 that scrapes off any identifiable fields, images or text in approximately real time. While a compiled program comprises a sequence of instructions that is executed by a computer processor, a script comprises a program or sequence of instructions that is carried out by another program. Examples of scripting languages are JavaScript®, Perl®, REXX®, and Tcl/Tk®. In an embodiment, the script 338 comprises JavaScript®. A JavaScript® script in a webpage may run "client-side" on the web browser. The script 329 embedded on the GPS application 328 advantageously scrapes data from the GPS enabled device 322 and/or the abandoned search results 326.

At event 406, an indication that the user 320 has abandoned the GPS search results 326 is sent to the business entity 330. Alternatively, the indication that the user 320 has abandoned the GPS search results 326 is sent to the identification and marketing service 340.

At event 408, the data entered by the user 320 in the GPS enabled device 322 is scraped and sent to the identification and marketing service computing device 342, where it may be stored in the memory 346 as the scraped or captured data 348 and/or the database 350. In an embodiment, the script or snippet 329 records the user text and touch indications on the GPS enabled device 322 and determines the user location, and sends the recorded data and determined location to the information and marketing service 340 at step 410.

In an embodiment, as users 320 abandon the GPS search, the identification and marketing service 340 builds a matrix of the captured data 348. Additionally, any data retrieved from various data sources, such as the third party databases, is appended to the matrix.

In an embodiment, the script 329 embedded in the GPS application 328 scrapes the entered data. The GPS application has one or more fields configured to accept user-entered text and user touch indications. The GPS search comprises at least one hypertext markup language (HTML) element associated with the one or more fields, and the at least one HTML element has at least one attribute. The information and marketing service 340 builds a data structure based on the abandoned GPS search parses the data structure to obtain the at least one HTML element, stores the one or more of the at least one HTML element, the at least one attribute, and the user-entered text, and determines identifying information of the user based at least in part on the user-entered text and user touch indications.

In other embodiments, the entered data is scraped by web-scraping software. For example, web-scraping software may automatically recognize the data structure, provide a recording interface, provide scripting functions that can extract and transform content, and provide database interfaces that can store the scraped data 348 in databases.

In another embodiment, the entered data is scraped by text grepping and regular expression matching. For example, the UNIX® grep command or regular expression-matching facilities of programming languages, such as Perl® or Python®, extracts information.

In a further embodiment, Hypertext Transfer Protocol (HTTP) programming can scrape the entered data. For example, sending HTTP GET requests or POST requests to a server to retrieve the contents of that server can provide scraped data.

In yet other embodiments, HyperText Markup Language (HTML) parsers can scrape the entered data. For example, after a webpage renders, an HTML parser parses the rendered application page as if it is a browser and then grabs the data after the application page has fully loaded.

Vertical aggregation platforms can be used in other embodiments. These platforms create and monitor a multitude of "bots" for specific verticals with no man-in-the-loop and no work related to a specific target site. The preparation involves establishing the knowledge base for the entire vertical and then the platform creates the bots automatically. The platform's robustness is measured by the quality of the information it retrieves (usually number of fields) and its scalability (how quick it can scale up to hundreds or thousands of sites).

In some embodiments, Document Object Model (DOM) parsing is used to scrape the entered data. DOM parsing can use a web browser to retrieve the content and dynamic content on an application page. The parser then parses the DOM to extract elements.

In another embodiment, the entered data is scraped using semantic annotation recognizing. The application pages being scraped may embrace metadata or semantic markups and annotations, which can be used to locate specific data snippets. If the annotations are embedded in the webpages, this technique can be viewed as a special case of DOM parsing. In another case, the annotations, organized into a semantic layer, are stored and managed separately from the application pages, so the scrapers can retrieve data schema and instructions from this layer before scraping the pages.

In a further embodiment, the entered data is scraped by computer vision web-page analyzers, which identify and extract information from application pages by interpreting pages visually as a human being might.

In other embodiments, iris/eye recognition scraping uses augmented reality (AR) and virtual reality (VR) iris tracking combined with collecting data through visual location awareness and analytical association, and Beautiful Soup parses HTML documents to create a parse tree for parsed pages that can be used to extract data from HTML.

In other embodiments, cascading style sheets (CSS) scraping uses the CSS selectors to scrape application page data.

At event 410, the identification and marketing service 340 identifies the user 320 based at least in part on the scraped data 348. In one embodiment, the identification and marketing service 340 retrieves identifying information associated with the user 320 in the identification database 350 based on at least a part of the scraped data 348. In another embodiment, the identification and marketing service 340 retrieves identifying information associated with the user 320 in third party databases based on at least a part of the scraped data 348. In a further embodiment, the identification and marketing service 340 retrieves or captures identifying information associated with the user 320 that it has been approved to capture from the identification database 350, any third-party databases, and the like.

Examples of identifying information are name, address, email address, home phone number, cell phone number, work phone number, account number, desired service, income level, age, family size, age of children, employer, and the like. Other examples of identifying information may include social media accounts associated with a social media service or social networking service, such as, for example, Facebook®, Twitter®, OpenID®, Google+®, MySpace®, Bebo®, Friendster®, hi5®, Orkut®, PerfSpot®, Zorpia®, Netlog®, Habbo®, and the like. Additional examples of identifying information may include addresses of webmail services, such as Gmail™, AOL® mail, Yahoo!® Mail, Hotmail®, BlueTie®, Zoho® Mail, AIM® Mail, Mail.com®, Gawab.com®, FastMail®, and the like.

Further, the identifying information may comprise data indicating a preferred method of contacting the user. For example, a third-party database may comprise information relating to an analysis of consumer behavior that determines the likelihood a consumer will respond to a direct mail piece versus an email.

At event 412, the business entity 330 sends marketing materials to the identification and marketing service 340.

At event 414, the identification and marketing service 340 sends a personalized message to the user 320 using the identified preferred method of communicating with the user 320. The personalized message may include coupons and discounts, and the like from the marketing materials, to entice the user 320 to go to a location, a website, or the like, of the business entity 330. The personalized message or recovery message may include advertisements associated with the search results 326 or may include related information associated with the business entity 330, such as a link to the business entity 330 online. In an embodiment, the identification and marketing service 340 sends the personalized messages according to contact rules. In another embodiment, the personalized message is sent in real time or as soon as the identification and marketing service 340 determines that the user abandoned GPS search results 326, as most abandoned GPS searches may go cold within an hour, for example.

In an embodiment, the personalized messages are sent to the user 320 at the time or at approximately the time the user 320 abandons the GPS search result 326. In other embodiments, the personalized messages are sent to the user 320 at any time the user 320 is accessing the GPS application 328. In further embodiments, the personalized messages are sent later. The user 320 receiving the personalized message, can, for example, open the message, go directly to the business entity's website 334, or the like.

In an embodiment, at step 416, the business entity 330 sends the marketing materials directly to the user 320 in response to the indication that the user abandoned the search results.

Figure 5:
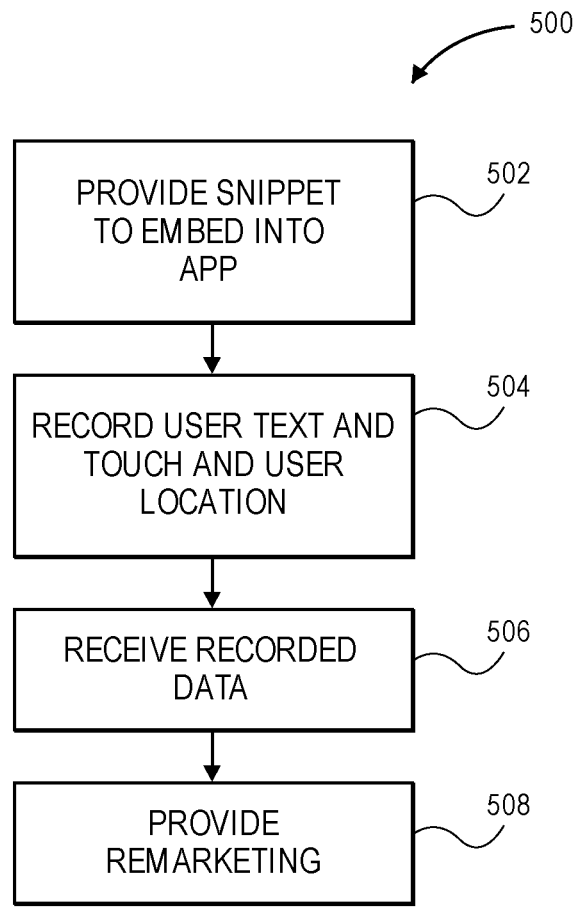
FIG. 5 is a flow chart illustrating a process to identify and to market to users that abandon GPS search results, according to certain embodiments.

FIG. 5 is a flow chart illustrating an exemplary process 500 to identify and market to users abandoning a GPS search. At block 502, the script or snippet 329 is provided to the business entity 330 or to a third party associated with the business entity 330 to embed into the GPS application 328 that is downloaded on the user's GPS enabled device 322. In an embodiment, the identification and marketing service 340 provides the script 329. In another embodiment, the identification and marketing service 340 provides custom JavaScript® to embed into the GPS application 328.

At block 504, the script 329 scrapes data from the GPS application 328, and at block 506, the scraped data 348 is received by the identification and marketing service 340. In an embodiment, the script or snippet 329 records user text and touch indications from the user's GPS enabled device 322. In an embodiment, the scraped data includes the user's location.

At block 508, the identification and marketing service 340 provides remarketing to the user 320. In an embodiment, one or more of the type of remarketing, the content of the remarketing, the address of the recipient of the remarketing, the name of the recipient of the remarketing are based at least in part on the scraped data 348. Examples of remarketing are direct mailings, social media messages, email messages, and the like, that are directed to enticing the user 320 to return to the business entity's location found in the GPS search results 326. If the user 320 abandoned the GPS search 326, the remarketing may include information that is deemed to be of greater interest to the user 320 than that of the GPS search 326.

Figure 6:
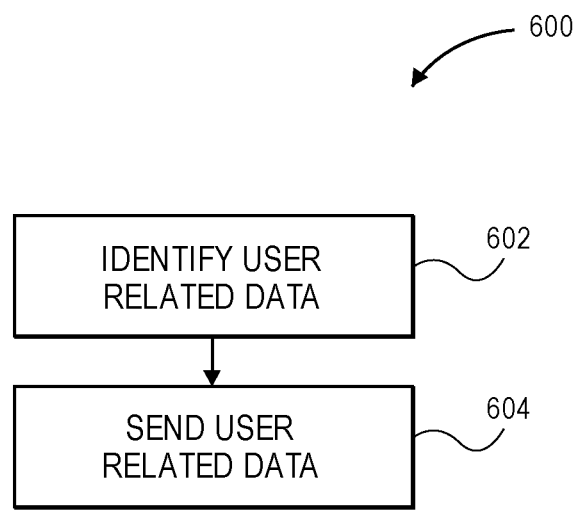
FIG. 6 is a flow chart illustrating a process to compile identified user data, according to certain embodiments.

FIG. 6 is a flow chart illustrating an exemplary process 600 to compile identified data. In addition to using the identified data to remarket or market to the user 320, business entities 330 are also interested in the statistics and analytics associated with the users 320 to their websites 334. The business entity 330 has no direct way to know how many GPS searches 326 were accessed and abandoned, who abandoned the GPS searches 326, and the like.

At block 602, the identification and marketing service 340 identifies the user 320 based at least in part on the data scraped from the GPS enabled device 322 after it has been determined that the user 320 abandoned the GPS search results 326. The user identification is associated with identifying information stored in one or more of the database 350 and third party databases.

In addition to receiving the data scraped from the user's GPS enabled device 322, the identification and marketing service 340 may track GPS search events that are associated with the user 320 performing the GPS search 326. In an embodiment, the tracking events are performed by the user 320. In other embodiments, the tracking events are performed by the scraping method and/or the identification and marketing service 340. In further embodiments, the events can be associated with the forms of user engagements, such as email, phone calls, social media messages, direct mailings, and the like. Examples of tracking events are:

The user selects a GPS search field.
The user enters information into the GPS search field.
The user updates the information in the GPS search field.
The scraping method or the identification and marketing service captures the user's first name.
The scraping method or the identification and marketing service captures the user's last name.
The scraping method or the identification and marketing service captures the user's full name.
The scraping method or the identification and marketing service captures a hidden field on the GPS search application.
The user revises the GPS search.
The user refreshes the GPS search.
The user visits the GPS search for the first time.
The user has been marked as not remarketable. Examples of users that are not remarketable are users with invalid contact information, users that opted out on the website, users that failed the rules or filter requirements, users that previously selected unsubscribe, users that complete the GPS search, and the like.
The user abandons the GPS search.

In an embodiment, each event is tracked with one or more of an IP address, a user agent, a timestamp, and the like. In other embodiments, the identification and marketing service 340 uses Node.JS determine whether the user 320 is still accessing the GPS search results 326 or has abandoned the GPS search results 326. In another embodiment, the identification and marketing service 340 tracks at least one, more than one, or every GPS search the user 320 visits. Further, the identification and marketing service 340 may capture the quantity and type of message sent to the user 320, the message-opening event, click through events, which links were clicks, the frequency of the abandoned GPS searches, and the like.

When the user 320 has been sent a remarketing email, the identification and marketing service 340 may track email events such as when the user 320 opens the email, when the user 320 clicks on a link in the email, the bounce type identifying why an email is undeliverable, when the email is successfully sent, when the user "unsubscribes", and the like. The email events can be tracked with a timestamp. The identification and marketing service 340 may also capture return user data, such as whether the user 320 returned to the webpage from a remarketing email, whether the user 320 opens the email and returned to the webpage by entering the web address in the browser, whether the user 320 returned to the webpage in response to other marketing that was deployed.

Further, the identification and marketing service 340 may capture data relating to the number of users 320 to a GPS application, the number of users 320 that complete a GPS search 326, and the number of users 320 that abandon a GPS search 326. There are at least four types of abandons: 1) identified; 2) not identified; 3) identified but not converted; and 4) not identified and not converted. Identified are those users 320 that provide sufficient information, such as address, first name, last name, email address, mobile phone number, and the like, such that they can be contacted. Converted are those users 320 that return to the GPS application 334 and complete the GPS search 326. The identification and marketing service 340 may also capture data relating the types of abandons per completion.

The identification and marketing service 340 may also capture data from saves. A save comprises the user 320 that abandons a GPS search 326, receives a remarketing message, and completes the GPS search 326 by visiting at least one location displayed in the GPS search results 326. Data collected on saves may comprise data indicating a preferred method of contacting the user and can be used to predict which marketing channel or message media to use to deliver the personalized message. For example, a third-party database may comprise data collected on saves relating to consumer behavior that determines the likelihood a consumer will respond to a direct mail piece versus an email.

At block 604, the identification and marketing service 340 compiles the identifying information and event tracking information to provide reports to the business entity 330 and/or to third parties associated with the business entity 330.

For example, the reports can report for trends, how many times a user 320 has abandoned, triggers that caused GPS search abandonment, suggested GPS application changes to retain users, and the like.

For example, the user data may comprise one or more of the gross number of users 320 for the GPS search 326 for the business entity for the date range selected, the average number of users 320 for the GPS search 326 for the business entity for the date range selected, the number of unique users for the business entity, an increase or decrease in the gross, average or unique users, and the like.

For example, the revisit data may comprise one or more of the gross number of returned users for the GPS search 326 for the date range selected, the average number of returned users for the GPS search 326 for the date range selected, the number of unique users to the GPS search 326, an increase or decrease in the gross, average or unique returned users, and the like.

For example, the abandonment data may comprise one or more of the gross number of abandons for the GPS search 326 for the date range selected, the average number of abandons for the GPS search 326 for the date range selected, the ratio of the number of gross abandons to the number of total users, the number of unidentified abandons for the GPS search 326 for the date range selected, number of identified users who have been identified as abandoned, the monetary value of the abandons, the unidentified abandons or the identified abandons, any increase or decrease in any of the abandonment data, and the like.

For example, the saved data may comprise one or more of the gross number, average number, or number of unique users for direct save users, influenced save users, and aware save users, as well as the monetary value and any increase or decrease associated with these users for the website for the date range selected, In an embodiment, a direct save user comprises a user who abandoned a GPS search 326, triggered and received at least one re-marketing email, and clicked a link that returns the user back to the business entity 330 within the re-marketing email within 24 hours after the link was clicked. In an embodiment, a influenced save user comprises a user who has abandoned the GPS search 326, triggered and received at least one re-marketing event, opened the email, or clicked the link that returns the user back to the business entity 330 within the re-marketing email, within 5 days of opening email or clicking the link. In an embodiment, an aware save user comprises a user who has abandoned the GPS search 326, triggered and received at least one re-marketing email, opened the email or clicked the link that returns the user back to the business entity within the re-marketing email after 5 days of opening email or clicking the link.

In an embodiment completed transactions data comprises one or more of the gross number or average number of completed transactions for the website for the date range selected, the monetary value of the completed transactions, any increase or decrease associated with these users, and the like.

In an embodiment, the top completed data comprises on or more of a list from most completed to least completed of the total number of times the GPS search was completed based on the selected date range, any change in rankings, and the like. In an embodiment, the top abandoned data comprises one or more of a list from most accessed to least accessed abandoned GPS searches from the selected date range, any change in rankings, and the like.

In an embodiment, the messages data comprises one or more of the gross number of unique opens for the selected date range, the average number of unique opens for the selected date range, the unique number of clicks of links that return to the business entity 330, any increase or decrease, and the like.

In yet another embodiment, the identification and marketing service 340 receives social media information associated with the business entity 330 from the social media site accessed by the user 320. For example, when the user 320 uses a Facebook® button to "like" the business entity 330, the data is correlated in real time with 1) the user's in-session browsing behavior; 2) the user's recent GPS search accesses; and 3) whether the business entity 330 and/or the GPS search 326 associated with the business entity 330 that the user 320 'likes' is 'hot' at that moment in time. The data is then used to determine the "next best action," which might include a one-to-one campaign relevant just for that individual 320—in real time or near real time versus days later when the user 320 may no longer be performing the GPS search 326. In an embodiment, the user 320 receives an email or social media message within one minute. In another embodiment, the user 320 receives an email or social media message within one hour.

Figure 7:
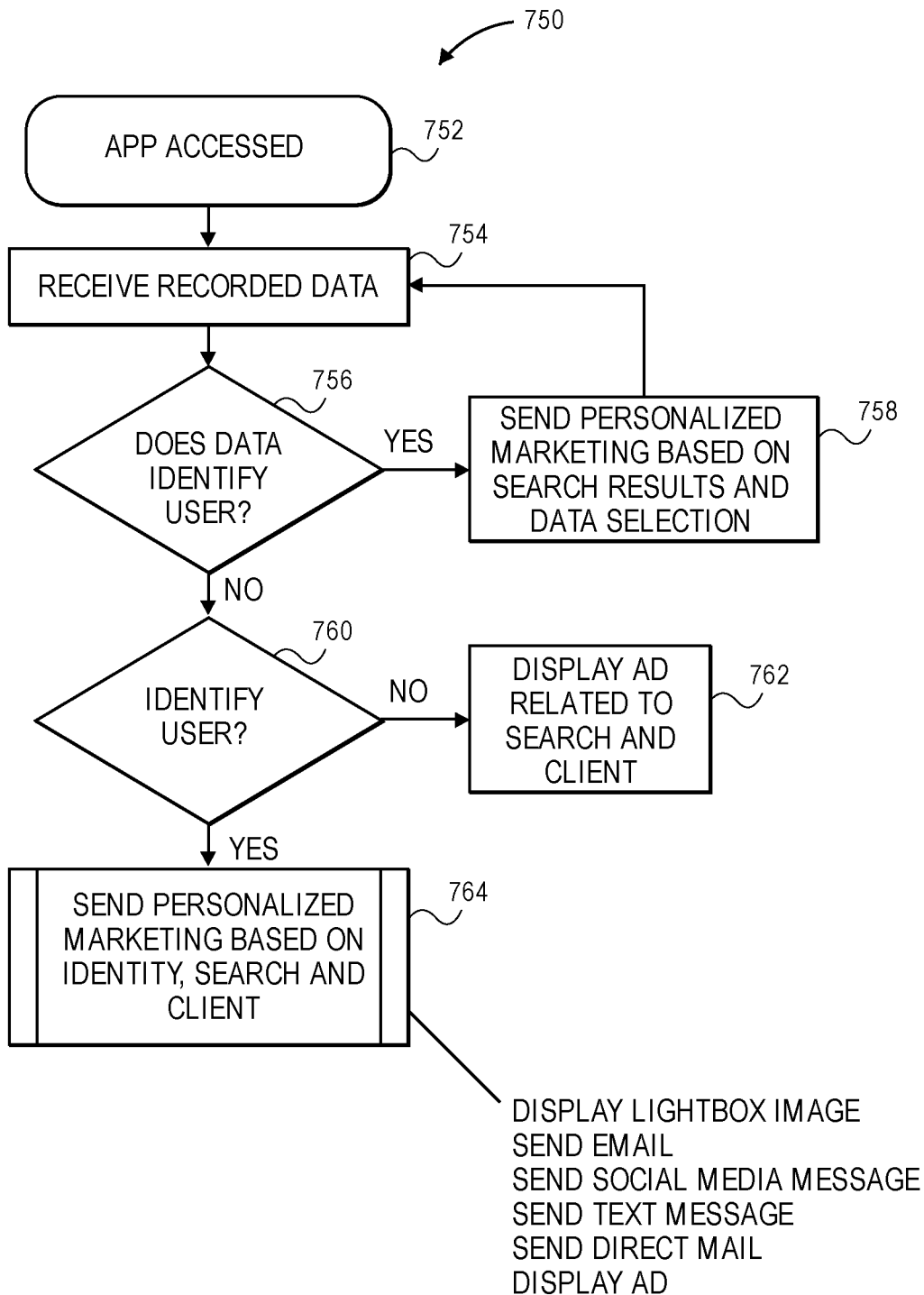
FIG. 7 is a flow chart illustrating a process to send personalized messages to users that abandon GPS searches, according to certain embodiments.

FIG. 7 is a flow chart illustrating an exemplary process 750 to send personalized messages to the user 320. At block 752, the user 320 accesses the GPS application 328. At block 754, the identification and marketing service 340 receives the scraped data 348.

In some circumstances, the user 320 performs certain actions on the GPS enabled device 322, such as texting or touching the touch screen that identify the user 320. If, at block 756, the scraped data 348 identifies the user 320, the process 750 moves to block 758 where a personalized message is sent to the user 320. In an embodiment, the personalized message is sent via the user's preferred communication method.

From block 758, the process 750 returns to block 754 to receive additional scraped data.

At other times, the user 320 may not perform sufficient actions on the GPS enabled device 322 to permit identification of the user 320 from the scraped data 348. If, at block 756, the scraped data 348 alone is insufficient to identify the user 320, the process 750 moves to block 760. At block 760, the scraped data 348 is used to look up and retrieve identifying information in the identification database 350. In other embodiments, third party databases are accessed to find and to retrieve identifying information based at least in part on the scraped data 348.

If the user cannot be identified, the process 752 displays an advertisement to the user 320 on the GPS enabled device 322 that was used to perform the GPS search 326.

If the system 750 retrieves identifying information from the database 350 or third party databases, the identification and marketing service 340 sends a personalized message to the user 320 at block 764. The personalized message may be send by one or more of displaying a lightbox advertisement to display an image on the GPS enabled device 322, sending an email to one or more identified email accounts, sending a social media message to one or more identified social media accounts, sending a text message to one or more identified cell phones, sending direct mail to the user's address, and displaying an advertisement on the display 324.

Figure 8:
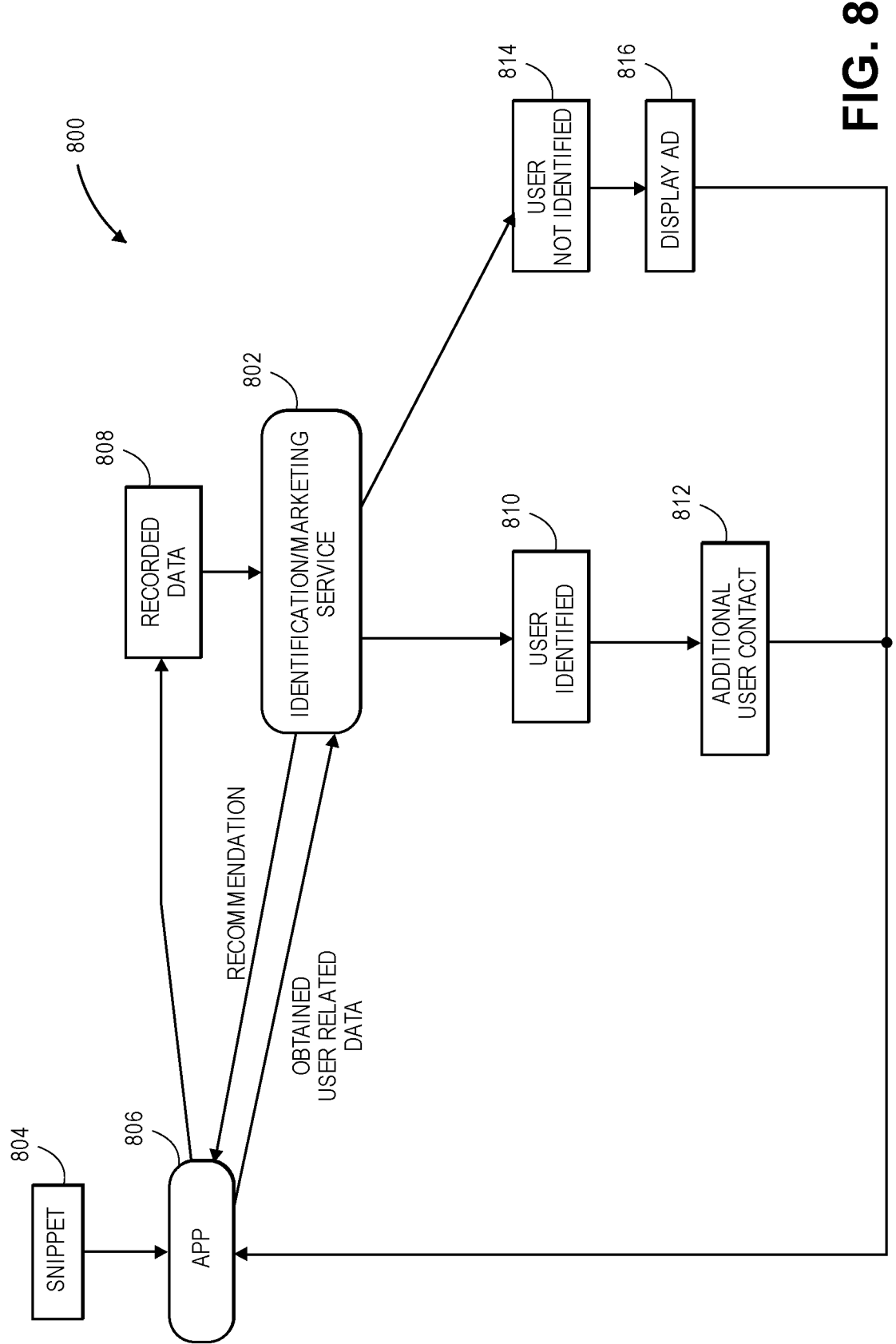
FIG. 8 illustrates an embodiment of identification marketing service functionality, according to certain embodiments.

FIG. 8 is a block diagram 800 illustrating functionality associated with an embodiment of an identification and marketing service 802. In an embodiment, script or snippet 804 is embedded in the GPS application 806. The GPS search is performed by a user or consumer. In one embodiment, the script 804 scrapes data 808 from the GPS search results and/or the GPS enabled device after it is determined that that user abandoned the GPS search. In other embodiments, other methods, such as web-scraping software, text grepping and regular expression matching, HTTP programming, HTML parsing, DOM parsing, vertical aggregation platforms, semantic annotation recognition, computer vision web-page analyzers, and the like, are employed to scrape data 808 from the GPS search results and/or the GPS enabled device, as described herein.

The identification and marketing service 802 receives and records the user related data 808 obtained from the GPS search results and/or the GPS enabled device.

In an embodiment, the identification and marketing service 802 provides a recommendation to the user via the application 806. The recommendation may be based at least in part on the obtained user related data, on the GPS search related data 808, or on both the obtained user related data and the GPS search related data 808.

In some embodiments, the identification and marketing service 802 identifies the user 810 and sends an additional user contact 812 to the user to entice the user to visit the business entity.

In other embodiments, the user cannot be identified 814 and the identification and marketing service 802 displays an advertisement on the user's display device or sends an advertisement using the user's IP address to entice the user to visit the business entity.

Figure 9:
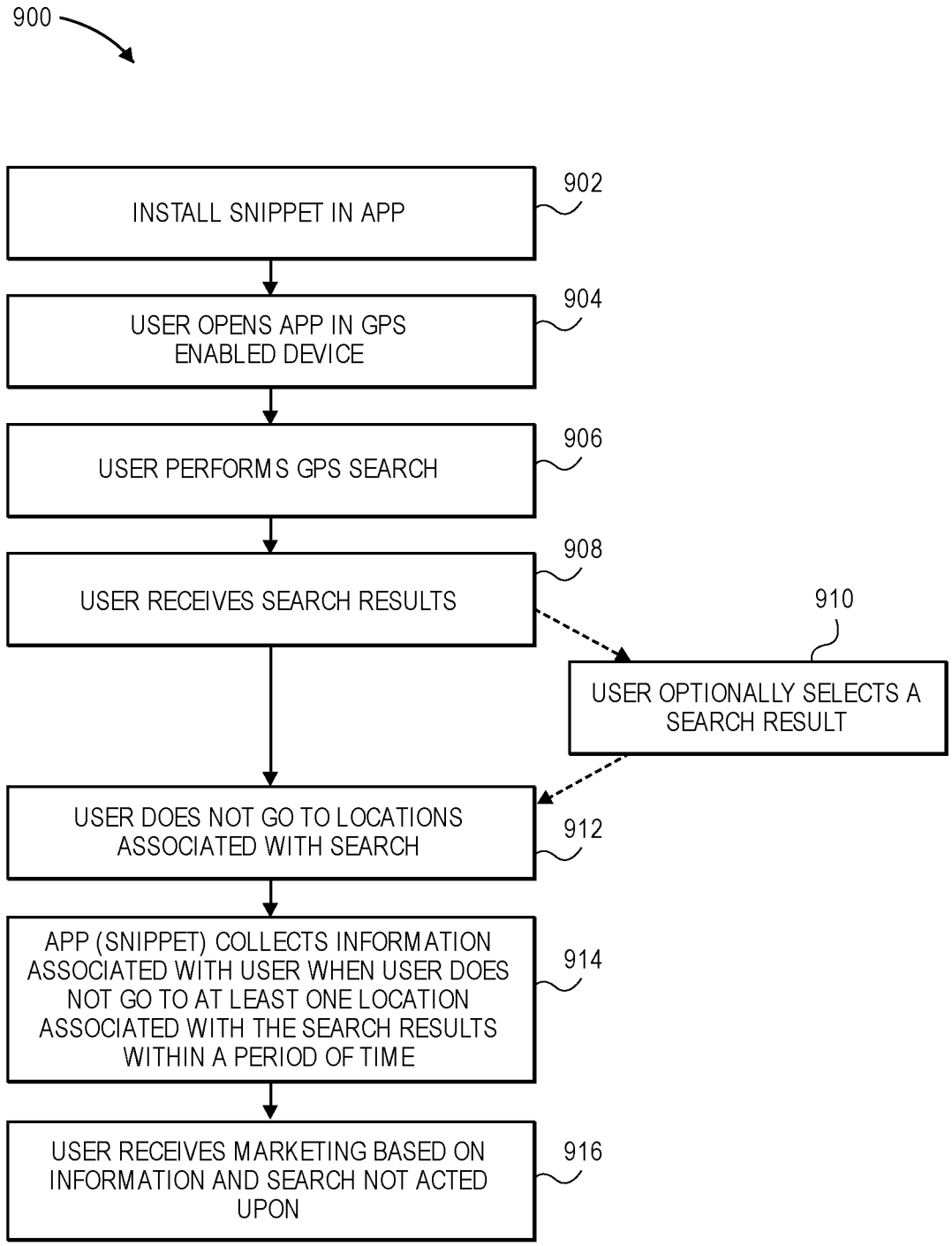
FIG. 9 is a flow chart illustrating a process to collect data from an abandoned GPS search, according to certain embodiments.

FIG. 9 is a flow chart illustrating a process 900 to collect data from an abandoned GPS search. At step 902, the snippet of code is installed on the GPS application. The snippet can be installed by the identification and marketing service before or after the user installs the application on the GPS enabled device, by the owner or creator of the GPS application before or after the user installs the application on the GPS enabled device, or by a third party before or after the user installs the application on the GPS enabled device.

At step 904, the user opens the GPS application in the GPS enabled device; at step 906, the user performs a GPS search; and at step 908, the user receives the GPS search results.

At step 910, the user optionally selects a search result. At step 912, the user does not go to the locations associated with the GPS search. At step 914, the snippet in the GPS application collects information associated with the user when the user does not go to at least one location associated with the search results within a period of time. In an embodiment, the period of time is approximately one hour, less than one hour, more than one hour, approximately one day, less than one day, more than one day, a week, or the like. In an embodiment, the period of time varies with the category of search. For example, the period of time associated with a search for pizza restaurants may be one hour or less, such that any remarketing can reach the user while the user is still looking for a place to eat. In another example, the period of time associated with a search for a smog check business may be approximately one day.

At step 916, the user receives marketing based at least in part on the data collected by the snippet and the search not acted upon.

Figure 10:
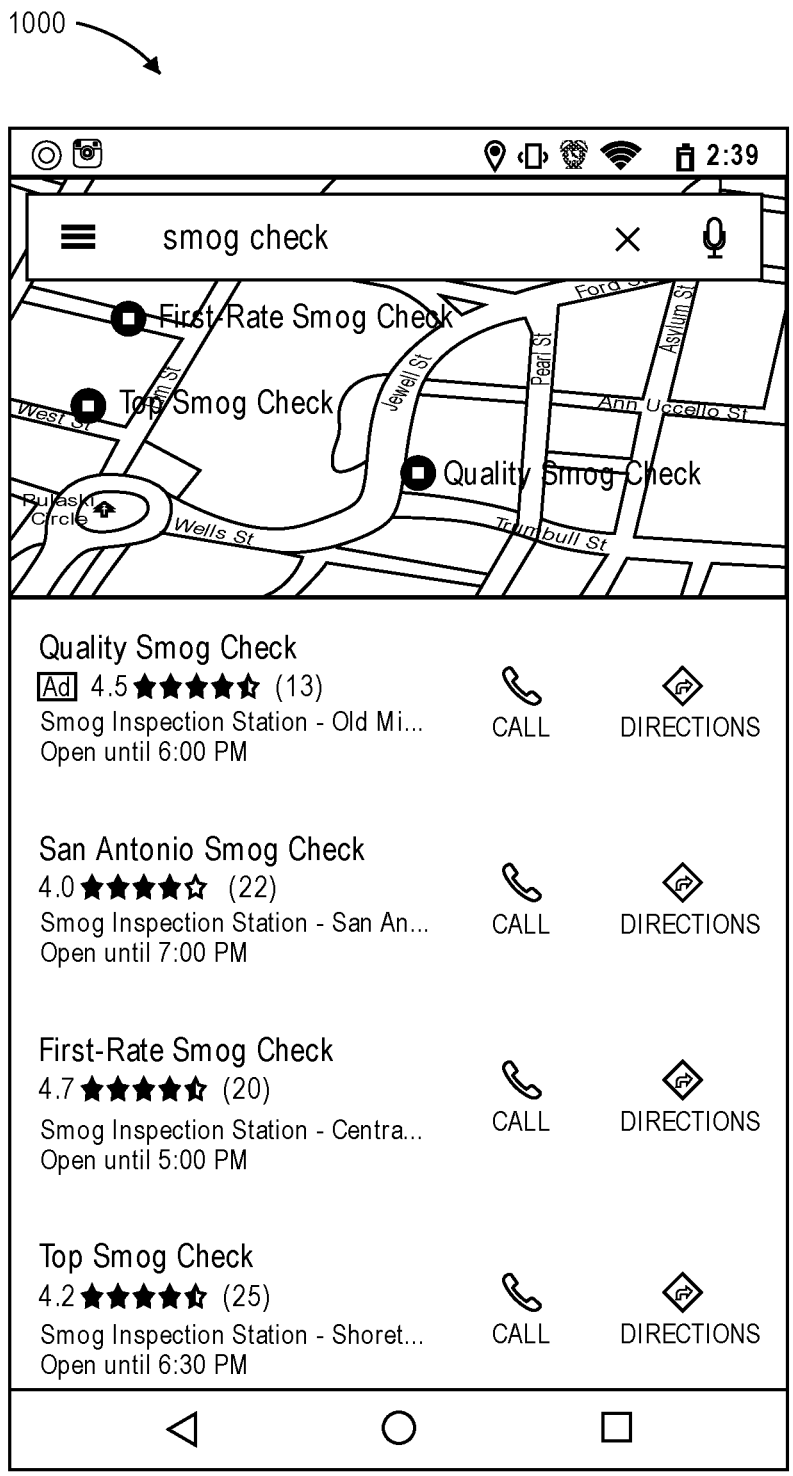
FIG. 10 is an exemplary GPS search result, according to certain embodiments.

FIG. 10 is an exemplary GPS search result 1000 for a GPS search of smog check locations located near the user. In the illustrated example, the GPS search has returned four search results and a map indicating the location of each of the four smog check businesses. The user is also provided with the options to request specific directions or to place a phone call for each of the four businesses in the GPS search result 1000.

Figure 11:
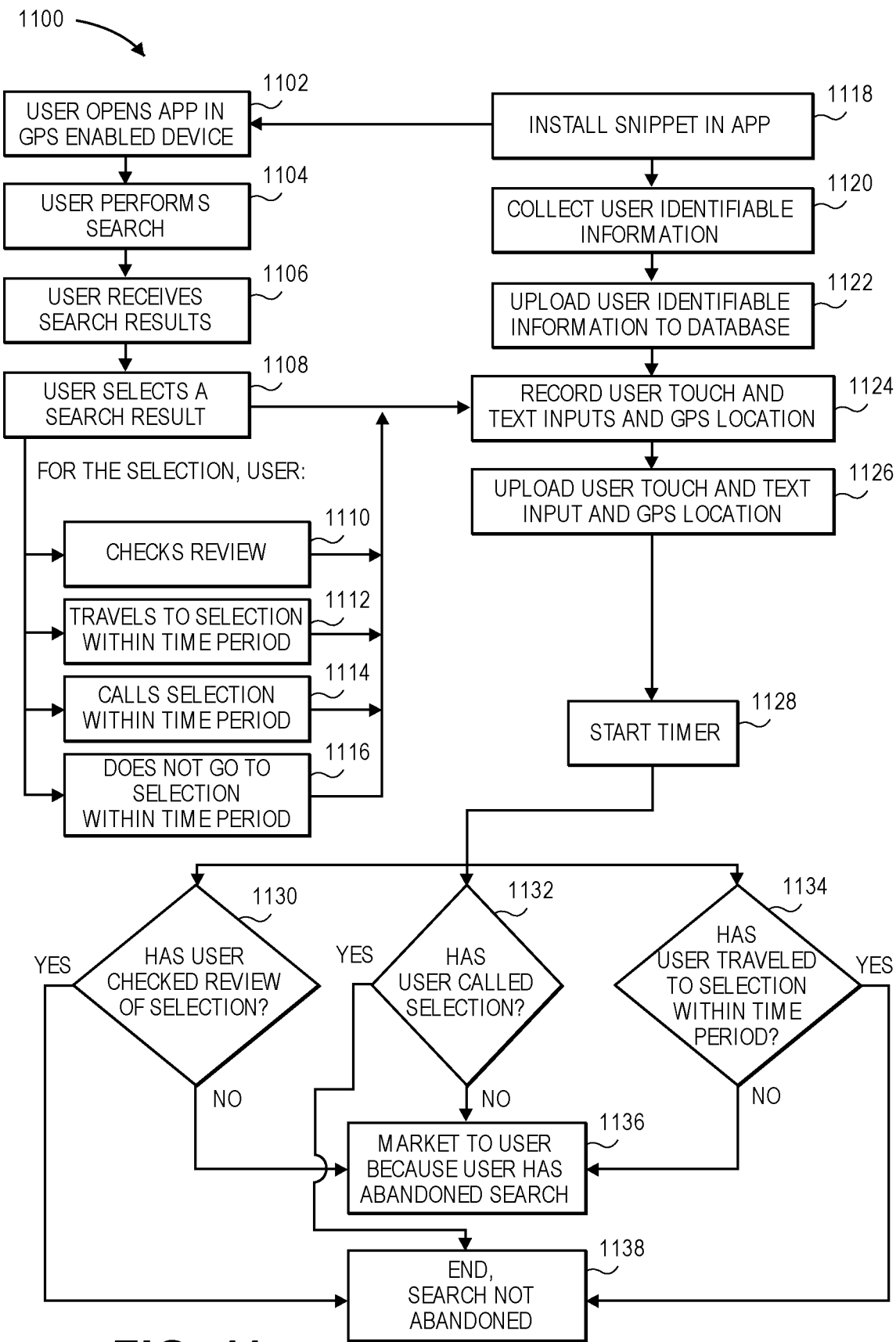
FIG. 11 is a flow chart illustrating a process to collect data from a GPS enabled device where the user has abandoned a GPS search, according to certain embodiments.

FIG. 11 is a flow chart illustrating an exemplary process 1100 to collect data from a GPS enabled device where the user has abandoned a GPS search.

At step 1118, the snippet is installed in the GPS application. In one embodiment, the snippet is installed in the GPS application prior to GPS application being installed onto the user's GPS enabled device. In another embodiment, the snippet is installed in the GPS application after the GPS application is installed in the user's GPS enabled device. The snippet can be installed by the business entity that owns or licenses the GPS application, the identification and marketing service, or the user.

At step 1102, the user opens the GPS application comprising the snippet on the GPS enabled device. At step 1104, the user performs a GPS search using the GPS application. At step 1106, the user receives the search results comprising a list of one or more business entities that satisfy the search criteria, and at step 1108, the user optionally selects a search result from the list.

For the selected search result, the user can perform one or more of the following. At step 1110, the user can check a review of the selection online. At step 1112, the user can travel to the location of the search result selection with a period of time. In an embodiment, the period of time is a predetermined period of time. At step 1114, the user can call the business entity associated with the selected search result within the period of time. At step 1116, the user can fail to travel to the location associated with business entity associated with the selected search result and/or fail to travel to any of the locations associated with the search results.

At step 1120, the snippet is collecting user identifiable information from the GPS search and the search results. At step 1122, the process 1100 uploads the collected user identifiable information to a database. In an embodiment, the database is associated with the information and marketing service.

At step 1124, while the user is performing steps 1110-1116, the snippet is recording user touch and text inputs to the GPS enabled device. In addition, the snippet is recording the location of the GPS enabled device. At step 1126, the process 1100 uploads the recorded user touch and text input and the location information to the database.

At step 1128, the snippet starts a timer to determine whether the user has abandoned the GPS search within a period of time. In an embodiment, the period of time is predetermined. In another embodiment, the period of time varies depending on the category of the search.

Steps 1130-1134 are examples of user actions or inactions that can be used to determine whether the user has abandoned the GPS search. At step 1126, the process 1100 determines, based on the user touch and text inputs, whether the user has checked an online review of one or more of the search results within the period of time. When the user has checked an online review of one or more of the search results, the user has not abandoned the search, and the process 1100 ends at step 1138. When the user has not checked an online review of one or more of the search results, the user has abandoned the GPS search, and the process 1100 moves to step 1136.

At step 1132, the process 1100 determines based on the user touch and text inputs, whether the user has contacted, by calling or texting, for example, one or more of the search results within the period of time. When the user has contacted one or more of the search results, the user has not abandoned the search, and the process 1100 ends at step 1138. When the user has not contacted one or more of the search results, the user has abandoned the GPS search, and the process 1100 moves to step 1136.

At step 1134, the process 1100 determines whether the user has traveled to at least one of the search results within the period of time by tracking the location of the GPS enabled device. When the user has traveled to at least one of the search results, the user has not abandoned the search, and the process 1100 ends at step 1138. When the user has not traveled to at least one of the search results, the user has abandoned the GPS search, and the process 1100 moves to step 1136.

At step 1136, the process 1100 markets or remarkets to the user. In an embodiment, the identification and marketing service contacts the user with marketing materials related to the abandoned GPS search. In an embodiment, a third party contacts the user with marketing materials related to the abandoned GPS search. In an embodiment, one or more of the business entities identified in the abandoned GPS search contacts the user with marketing materials related to the abandoned GPS search.

Figure 12:
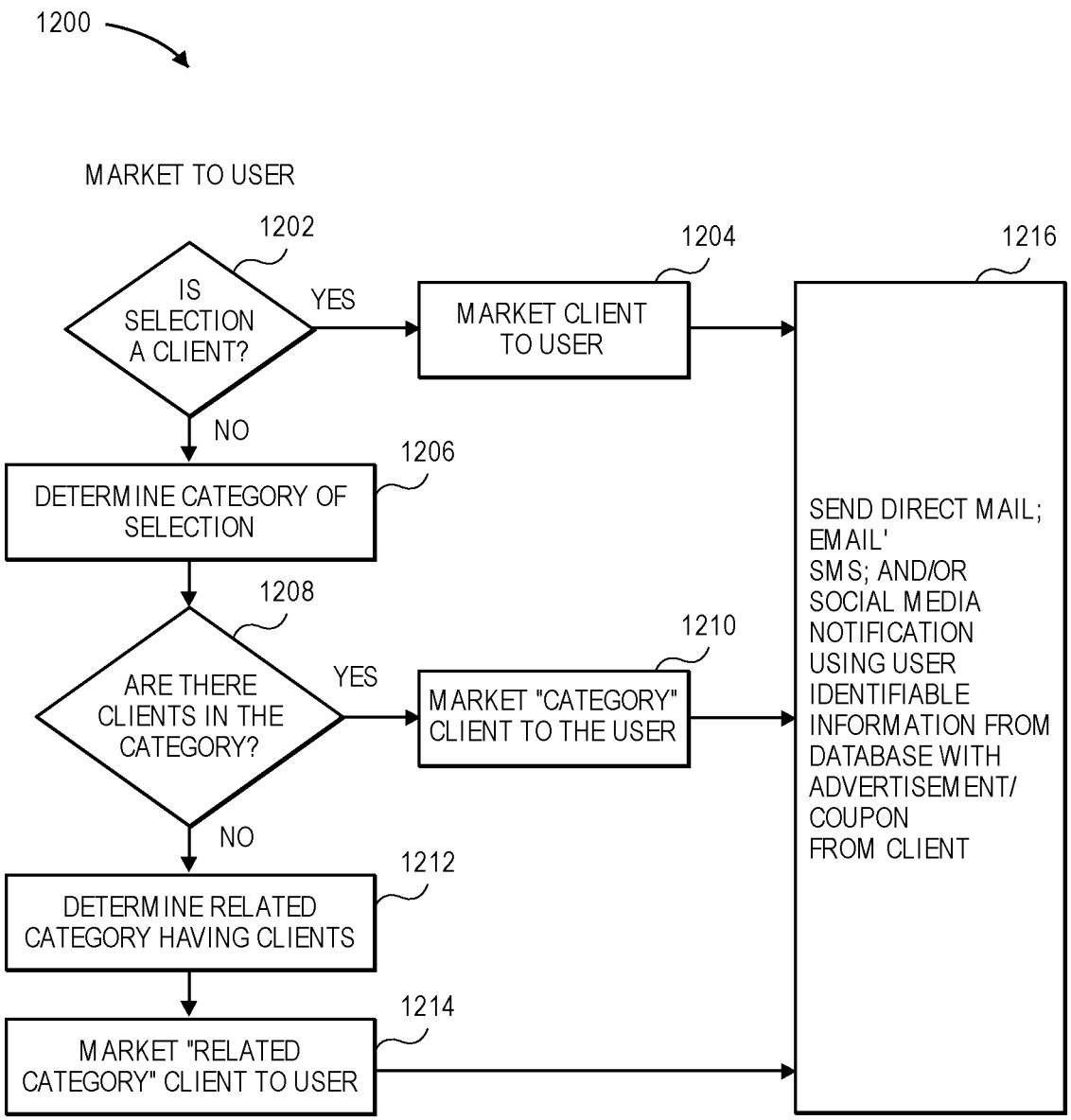
FIG. 12 is a flow chart illustrating a process to market to users that have abandoned a GPS search, according to certain embodiments.

FIG. 12 is a flow chart illustrating an exemplary process 1200 to market to users that have abandoned a GPS search. At step 1202, the process 1200 determines if the selected search result of the abandoned GPS search is a client. At step 1204, when the selected search result is a client, the process 1200 markets the client to the user by performing one or more of the actions in step 1216. If the selected search result is not a client, the process 1200 moves to step 1206.

At step 1206, the process 1200 determines the category of the GPS search. Examples of categories are restaurants, gas stations, car repair services, hair salons, and the like.

At step 1208, the process 1200 determines whether there are clients in the category. At step 1210, when there are clients that perform services or sell products that are in the same category as the abandoned GPS search, the process 1200 markets the client belonging to the category to the user by performing one or more of the actions in step 1216. If there are no clients in the category, the process 1200 moves to step 1212.

At step 1212, the process 1200 determines whether there are clients in a related category to the category of the abandoned GPS search. When there are clients in a related category, the process 1200, at step 1214, markets to the clients in the related category by performing one or more of the actions at step 1216. For example, if the determined category is pizza restaurant, a related category may be a nearby fast food restaurant.

At step 1216, the process 1200 markets to the user by performing one or more of sending direct mail, send an email, and sending a social media notification using the user information stored in the database. The marketing materials may comprise one or more of an advertisement and a coupon from the client, the category client, and the related category client.

Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

All of the processes and steps described above as being implemented by the identification and marketing service may be performed and fully automated by a computer system. The computer system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various identification and marketing service functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combinations of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure.

What is claimed is:

1. A method to obtain data from abandoned Global Positioning System (GPS) searches, the method comprising:
    obtaining user-entered text and user touch indications of a GPS search on a computing device running an application with GPS functionality having embedded data scraping script and one or more fields configured to accept the user-entered text and the user touch indications, a GPS search comprising at least one hypertext markup language (HTML) element associated with the one or more fields;
    determining, that the GPS search has been abandoned based at least in part on obtaining with the computing device, additional user-entered touch indications, and using the additional user-entered touch indications to determine whether the user has checked a review associated with a search result within a time period;
    obtaining data from the abandoned GPS search with the embedded data scraping script that is configured to locate the at least one HTML element by building a data structure based on the abandoned GPS search and parsing the data structure to obtain one or more of the user-entered text and user touch indications associated with the at least one HTML element;
    communicating with one or more databases to obtain one or more identifying information of a user based at least in part on the obtained user-entered text and user touch indications from the abandoned GPS search; and
    sending a personalized message to the user based at least in part on the one or more identifying information of the user and the at least one HTML element.

2. The method of claim 1 wherein determining that the GPS search has been abandoned by the user includes tracking the location of the computer device with GPS data to determine that the user has not traveled to a location associated with a search result with a time period.

3. The method of claim 1 further comprising identifying a preferred communication medium of the user based at least in part on the one or more identifying information obtained from the one or more databases.

4. The method of claim 3 wherein identifying the communication medium comprises identifying a preferred communication medium of the user.

5. The method of claim 4 wherein the personalized message is sent to the user via the preferred communication medium.

6. The method of claim 1 further comprising determining a location of the user, wherein determining that the GPS search has been abandoned by the user is based at least in part on the location of the user.

7. A method to obtain data from abandoned Global Positioning System (GPS) searches, the method comprising:
    obtaining user-entered text and user touch indications of a GPS search accessed by a user on a computing device configured to run an application with GPS functionality having embedded data scraping script and one or more fields configured to accept the user-entered text and the user touch indications, the GPS search comprising at least one hypertext markup language (HTML) element associated with the one or more fields;
    determining that the GPS search has been abandoned based at least in part on obtaining with the computing device, additional user-entered touch indications, and using the additional user-entered touch indications to determine whether the user has checked a review associated with a search result within a time period;
    building, using the embedded data scraping script, a data structure based on the abandoned GPS search;
    parsing, using the embedded data scraping script, the data structure to locate obtain one or more of the user-entered text and user touch indications associated with the at least one HTML element;
    communicating with one or more databases to obtain additional information associated with user based at least in part on the obtained user-entered text and user touch indications from the abandoned GPS search; and
    storing a personal attribute report that comprises at least a portion of the obtained user-entered text and user touch indications and at least a portion of the one or more identifying information obtained from the one or more databases.

8. The method of claim 7 further comprising sending a personalized message to the user based at least in part on the personal attribute report and the at least one HTML element.

9. The method of claim 7 further comprising storing one or more of the at least one HTML element, at least one attribute associated with the at least one HTML element, and the obtained user-entered text from the abandoned GPS search.

10. The method of claim 7 wherein the personalized message comprises one or more of a coupon, a reminder, information related to the electronic form, discount notifications, an offering related to the GPS search, a link to return to a webpage associated with the GPS search, a lightbox image, and an advertisement.

11. The method of claim 8 wherein the embedded data scraping script comprises custom code placed in the GPS application that scrapes off any identifiable fields, images or text in approximately real time.

12. The method of claim 7 further comprising building a matrix of scraped data and the obtained additional information.

13. The method of claim 7 wherein determining that the GPS search has been abandoned by the user includes tracking the location of the computer device with GPS data to determine that the user has not traveled to a location associated with a search result with a time period.

14. A method to obtain data from abandoned Global Positioning System (GPS) searches, the method comprising:
   obtaining user-entered text and user touch indications of a GPS search on a computing device running an application with GPS functionality having embedded data scraping script and one or more fields configured to accept the user-entered text and the user touch indications, a GPS search comprising at least one hypertext markup language (HTML) element associated with the one or more fields;
   determining, that the GPS search has been abandoned based at least in part on obtaining with the computing device, additional user-entered user touch indications, using the additional user-entered touch indications to determine whether the user has called a phone number associated with a search result within a time period
   obtaining data from the abandoned GPS search with the embedded data scraping script that is configured to locate the at least one HTML element by building a data structure based on the abandoned GPS search and parsing the data structure to obtain one or more of the user-entered text and user touch indications associated with the at least one HTML element;
   communicating with one or more databases to obtain one or more identifying information of a user based at least in part on the obtained user-entered text and user touch indications from the abandoned GPS search; and
   sending a personalized message to the user based at least in part on the one or more identifying information of the user and the at least one HTML element.

15. An apparatus to obtain data from abandoned Global Positioning System (GPS) searches, the apparatus comprising:
   computer hardware comprising one or more computer processors, the computer hardware configured to:
   obtain user-entered text and user touch indications of a GPS search on a computing device running an application with GPS functionality having embedded data scraping script and one or more fields configured to accept the user-entered text and the user touch indications, the GPS search comprising at least one hypertext markup language (HTML) element associated with the one or more fields;
   determine, that the GPS search has been abandoned based at least in part on additional user-entered user touch indications obtained by the computer hardware, wherein the additional user-entered touch indications are used to determine whether the user has called a phone number associated with the search result
   obtain data from the abandoned GPS search with the embedded data scraping script that is configured to locate the at least one HTML element by building a data structure based on the abandoned GPS search and parsing the data structure to obtain one or more of the user-entered text and user touch indications associated with the at least one HTML element;
   communicate with one or more databases to obtain one or more identifying information of a user based at least in part on the obtained user-entered text and user touch indications from the abandoned GPS search; and
   send a personalized message to the user based at least in part on the one or more identifying information of the user and the at least one HTML element.

16. An apparatus to obtain data from abandoned Global Positioning System (GPS) searches, the apparatus comprising:
   computer hardware comprising one or more computer processors, the computer hardware configured to:
   obtain user-entered text and user touch indications of a GPS search on a computing device running an application with GPS functionality having embedded data scraping script and one or more fields configured to accept the user-entered text and the user touch indications, the GPS search comprising at least one hypertext markup language (HTML) element associated with the one or more fields;
   determine, that the GPS search has been abandoned based at least in part on additional user-entered user touch indications obtained by the computer hardware, wherein the additional user-entered touch indications are used to determine whether the user has checked a review associated with a search result within a time period;
   obtain data from the abandoned GPS search with the embedded data scraping script that is configured to locate the at least one HTML element by building a data structure based on the abandoned GPS search and parsing the data structure to obtain one or more of the user-entered text and user touch indications associated with the at least one HTML element;
   communicate with one or more databases to obtain one or more identifying information of a user based at least in part on the obtained user-entered text and user touch indications from the abandoned GPS search; and
   send a personalized message to the user based at least in part on the one or more identifying information of the user and the at least one HTML element.

17. The apparatus of claim 16 wherein determining that the GPS search has been abandoned by the user includes tracking the location of the computer hardware with GPS data to determine that the user has not traveled to a location associated with a search result.

18. The apparatus of claim 16 wherein the obtained data comprises a preferred communication medium of the user.

* * * * *